United States Patent [19]
Thanos et al.

[11] Patent Number: 5,446,609
[45] Date of Patent: Aug. 29, 1995

[54] LOW PROFILE DISK DRIVE ASSEMBLY

[75] Inventors: William N. Thanos; Steven L. Kaczeus; James D. Fahey, all of San Jose, Calif.

[73] Assignees: TEAC Corporation, Tokyo, Japan; Pont Peripherals Corporation, Sunnyvale, Calif.

[21] Appl. No.: 963,316

[22] Filed: Oct. 15, 1992

Related U.S. Application Data

[63] Continuation-in-part of Ser. No. 764,590, Sep. 24, 1991, abandoned.

[51] Int. Cl.$^6$ .............................................. G11B 5/012
[52] U.S. Cl. ............................ 360/97.02; 360/98.03; G11B/5/012
[58] Field of Search ............... 360/97.02, 97.03, 98.03, 360/104, 108, 98.01

[56] References Cited

U.S. PATENT DOCUMENTS

| | | | |
|---|---|---|---|
| 4,034,411 | 7/1977 | Kraemer et al. | 360/97.01 |
| 4,568,988 | 2/1986 | McGinlay et al. | 360/77 |
| 4,636,905 | 1/1987 | Morimoto et al. | 360/137 |
| 4,639,863 | 1/1987 | Harrison et al. | 360/97 |

(List continued on next page.)

OTHER PUBLICATIONS

Hardcard. The Inside Story; Plus Development Corp., 1778 McCarthy Boulevard, Milpitas, California 95035-7421.
Aerodynamics of Disk Drives; R. Lennemann; Mar. 12, 1974.
High-Performance PC XT/AT/ Disk Controller; Apr. 1992.
Point 5: A new Concept in Data Storage; Kalok Corp.; 1993.
"Multichip Modules: Systems Advantages, Major Constructions, and Materials Technology", edited by R. Wayne Johnson et al., IEEE Press Selected Reprint Series, institute of Electrical and Electronics Engineers, Inc. 1990, pp. 1-4.
Dr. Maurice G. Sage, "Future of Multichip Modules In Electronics", Proc. NEPCOM West '89, pp. 14-20.
John D. Balde, "New Packaging Strategy to Reduce System Costs", IEEE Trans. Components, Hybrids, Manuf. Technol. vol. CHMT-7, No. 3, Sep. 1984, pp. 7-10.

*Primary Examiner*—Paul M. Dzierzynski

[57] ABSTRACT

A low profile disk drive assembly comprises an enclosure having a sealed volume substantially laterally displaced with respect to a circuit volume. The sealed volume has an extension which extends laterally toward one corner portion of the enclosure whereas the circuit volume is disposed substantially within an adjacent corner portion of the enclosure. The sealed volume contains one or more disks and a read/write head actuator assembly. A flexible circuit, which couples to the read/write head actuator assembly inside the sealed volume, extends from inside sealed volume, through a wall of the enclosure which separates the sealed volume from the circuit volume, across the circuit volume, and to an interface connector. The interface connector may be used to connect the disk drive assembly to a system with which the disk drive assembly is to operate. A multichip module is mounted on one side of the flexible circuit inside the circuit volume. Preamplification circuitry is mounted on one side of the flexible circuit inside the sealed volume. The flexible circuit, the multichip module, and the preamplification circuit may comprise a separately testable subassembly. In some embodiments, a portion of the enclosure is removable to allow access to the circuitry, such as the multichip module, mounted on the flexible circuit in the circuit volume.

33 Claims, 6 Drawing Sheets

U.S. PATENT DOCUMENTS

| | | | |
|---|---|---|---|
| 4,666,739 | 5/1987 | Roubal | 427/97 |
| 4,712,146 | 12/1987 | Moon et al. | 360/97 |
| 4,724,495 | 2/1988 | Hedberg et al. | 360/22 |
| 4,790,912 | 12/1988 | Hotzman et al. | 204/15 |
| 4,810,333 | 3/1989 | Gulla et al. | 204/15 |
| 4,858,034 | 8/1989 | Hassel et al. | 360/51 |
| 4,920,434 | 4/1990 | Brown et al. | 360/77.08 |
| 4,931,889 | 6/1990 | Osefune | 360/78.07 |
| 4,933,785 | 6/1990 | Morehouse et al. | 360/78.04 |
| 4,965,684 | 10/1990 | Stefansky | 360/78.12 |
| 4,991,129 | 2/1991 | Swartz | 360/69 |
| 4,992,899 | 2/1991 | Kaczeus et al. | 360/106 |
| 5,025,335 | 6/1991 | Stefansky | 360/97.01 |
| 5,025,336 | 6/1991 | Morehouse et al. | 360/97.02 |
| 5,027,242 | 6/1991 | Nishida et al. | 360/106 |
| 5,038,239 | 8/1991 | Vettel et al. | 360/97.03 |
| 5,041,924 | 8/1991 | Blackborow et al. | 360/69 |
| 5,073,396 | 12/1991 | Best et al. | 360/77.08 |
| 5,095,396 | 3/1992 | Putnam et al. | 360/106 |
| 5,170,299 | 12/1992 | Moon | 360/77.08 |
| 5,210,660 | 5/1993 | Hetzler | 360/51 |
| 5,210,854 | 5/1993 | Beaverton et al. | 395/500 |
| 5,263,003 | 11/1993 | Cowles et al. | 365/230.03 |
| 5,283,704 | 2/1994 | Reidenbach | 360/104 |
| 5,291,355 | 3/1994 | Hatch et al. | 360/97.01 |
| 5,291,584 | 3/1994 | Challa et al. | 364/DIG. 1 |
| 5,337,202 | 8/1994 | Jabbarai et al. | 360/97.01 |
| 5,345,352 | 9/1994 | Nakano | 360/97.01 |

LOW PROFILE DISK DRIVE ASSEMBLY

This application is a continuation-in-part of copending U.S. patent application Ser. No. 07/764,590, now abandoned entitled "High Capacity, Low Profile Disk Drive System," filed Sep. 24, 1991.

FIELD OF THE INVENTION

This invention relates to disk drive assemblies. More particularly, this invention relates to low profile disk drive assemblies.

BACKGROUND

The physical dimensions of a disk drive assembly may be described as a "form factor". A form factor is an industry standard of length, width and height dimensions. Alternatively, the length and width dimensions of a disk drive assembly may be referred to together as a lateral form factor area and the height may be referred to as a vertical thickness. A lateral form factor area may, in a 3.5 inch diameter disk drive, be 4.00 inches by 5.75 inches whereas a corresponding vertical thickness may be, for example, 0.5 inches. As the lateral form factor area and vertical thickness of disk drive assemblies has decreased over time, the available area on which to place the required electronic circuitry of the disk drive assembly has also decreased.

Early disk drive assemblies typically had a printed circuit board which extended over substantially the entire lateral area of the form factor. The disk or disks themselves were usually disposed in a sealed enclosure, the bottom surface of the sealed enclosure being disposed to be parallel with the plane of the printed circuit board outside the sealed enclosure. Electronics on this printed circuit board was coupled to a read/write head actuator mechanism inside the sealed housing via a connector which passed through the enclosure. An interface connector on the printed circuit board allowed the disk drive assembly to connect to a system with which the disk drive assembly was to operate.

As disk drive technology progressed, advances in disk drive assemblies were made. One such advance is disclosed in copending and commonly owned U.S. patent application Ser. No. 07/764,590, now abandoned, the subject matter of which is incorporated herein by reference. In the 07/764,590 patent application now abandoned, a disk drive assembly is disclosed in which a printed circuit board is placed in a corner portion of a 4.00 inch by 5.75 inch lateral form factor area enclosure so that the printed circuit board and the electronics disposed on it are located outside of a sealed volume containing the disk(s). This printed circuit board is, in some embodiments, a substantially triangularly shaped printed circuit board which is disposed substantially in the same plane as the plane of a single disk. To enable substantially all the required circuitry except for read/write head preamplification circuitry to be disposed on this relatively small printed circuit board, the integrated circuit chips making up the circuitry are mounted both on both the top surface and also on the bottom surface of the printed circuit board. The added thickness due to the placement of integrated circuit chips on both the top and bottom surfaces of the printed circuit board is accommodated due to the printed circuit board not extending either over or under the disk(s) in the sealed volume. Accordingly, a larger portion of the full vertical thickness of the disk drive assembly is usable for the printed circuit board and its associated integrated circuit chips.

A flexible circuit disclosed in the 07/764,590 patent application is used to couple a read/write head disposed at the end of a load beam to circuitry on the printed circuit board. One end of this flexible circuit attaches to the load beam near the load beam pivot. The flexible circuit passes from the sealed volume and into the corner portion of the enclosure to a first part of a flexible circuit to printed circuit board connector. The printed circuit board, bearing a second part of the flexible circuit to printed circuit connector, is slidable into the corner portion of the enclosure so that the second part of the flexible circuit to printed circuit connector disposed on the printed circuit board can mate with the first part of the flexible circuit to printed circuit board connector disposed on the flexible circuit. With the printed circuit board inserted into the corner portion and with the first and second parts of the flexible circuit to printed circuit board connector mated together, an interface connector disposed along one edge of the printed circuit board is oriented facing outwardly from the disk drive enclosure. This interface connector is usable to couple the disk drive assembly to a system with which the disk drive assembly is to operate.

In order to shrink the form factor of the disk drive assembly still further, from for example a 4.00 inch by 5.75 inch lateral form factor area down to a 2.75 inch by 4.00 inch lateral form factor area, the lateral area of the corner portion is also decreased. This decrease may not provide adequate space for placement of the required integrated circuit chips onto the printed circuit board in the corner portion. With current semiconductor processing technologies, multiple different integrated circuit chips must be used to realize inexpensively and reliably all the required disk drive circuitry. A single semiconductor processing technology has not yet been found which can both inexpensively and also reliably realize the required digital circuitry, analog circuitry, and power circuitry all on a single integrated circuit chip. Moreover, the flexible circuit to printed circuit connector consumes a substantial portion of the scarce surface area of the printed circuit board. Accordingly, it is difficult in reduced form factor area disk drive assemblies to place all the required different integrated circuit chip packages and all the required connectors onto the two surfaces of a printed circuit board in the corner portion of the form factor.

SUMMARY OF THE INVENTION

A low profile reduced form factor area disk drive assembly is therefore disclosed. This disk drive assembly has an enclosure which comprises a substantially sealed volume and a circuit volume. The sealed volume contains a read/write head actuator assembly and disk(s) whereas the circuit volume contains circuitry and an interface connector. The sealed volume and the circuit volume are disposed with respect to each other so that the circuit volume is substantially laterally displaced from the sealed volume by a wall of the enclosure and a gasket. In some embodiments, the circuit volume substantially occupies a corner portion of the enclosure whereas an adjacent corner portion of the enclosure is substantially occupied by a coil of the read/write head actuator assembly.

In order to obviate the need for a flexible circuit to printed circuit board connector in the circuit volume, no printed circuit board is provided in the circuit volume. Rather, a flexible circuit extends from inside the sealed volume, through a portion of the enclosure separating the sealed volume from the circuit volume, substantially laterally across the circuit volume, and to the interface connector. In order to be able to mount all the necessary integrated circuit chips onto the flexible circuit, the required integrated circuit chips except for the preamplification circuitry are, in some embodiments, realized in a single multichip module which is mounted on one side of the flexible circuit in the circuit volume. The provision of this multichip module allows all the electronic chips in the circuit volume to be mounted on one side of the flexible circuit. As a result, the expense of a complex two-sided flexible circuit is avoided. The provision of the multichip module also allows the flexible circuit and multichip module to comprise a separately testable sub-assembly. Furthermore, by locating the multichip module in the circuit volume and outside the sealed volume containing the read/write head actuator assembly, outgassing of the multichip module will not contaminate the disk and the read/write head actuator assembly and thereby will not compromise operation of the disk drive.

In some embodiments, a portion of the enclosure is removable while the seal of the sealed volume is maintained. Access is thereby provided to the circuitry such as the multichip module which is mounted on the flexible circuit in the circuit volume. Such a removable portion of the enclosure serves to allow repair and testing of the circuitry in the circuit volume despite the flexible circuit being fixed to the enclosure due to the flexible circuit passing through the portion of the enclosure that separates the sealed volume from the circuit volume.

In some embodiments, preamplification circuitry is disposed inside the sealed volume. Such preamplification circuitry is placed close to the read/write head actuator assembly and is shielded from the digital circuitry in the circuit volume. In some embodiments, the preamplification circuitry is realized at least in part by an integrated circuit package which is mounted on the flexible circuit. This integrated circuit package may be located either over or under a disk so that the preamplification circuitry need not be laterally spaced from the disk(s) of the disk drive assembly.

DETAILED DESCRIPTION OF THE DRAWINGS

Figure 1:
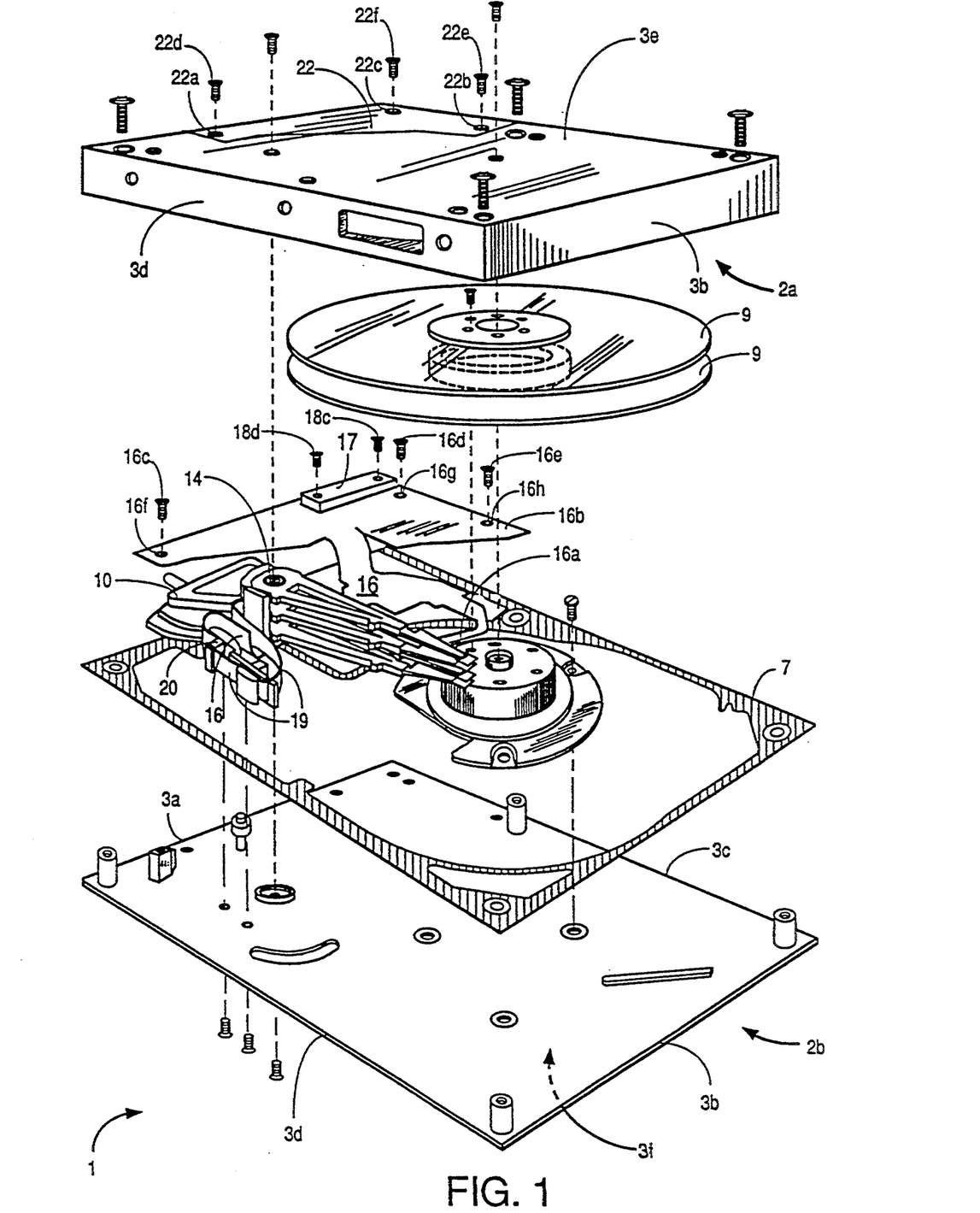
FIG. 1 is an exploded perspective view of one embodiment of a disk drive assembly in accordance with the present invention.

FIG. 1 is an exploded perspective view of a disk drive assembly 1 in accordance with one embodiment of the present invention. A three dimensional enclosure having a lateral form factor area and a vertical thickness comprises a cover member 2a and a base member 2b.

Figure 3:
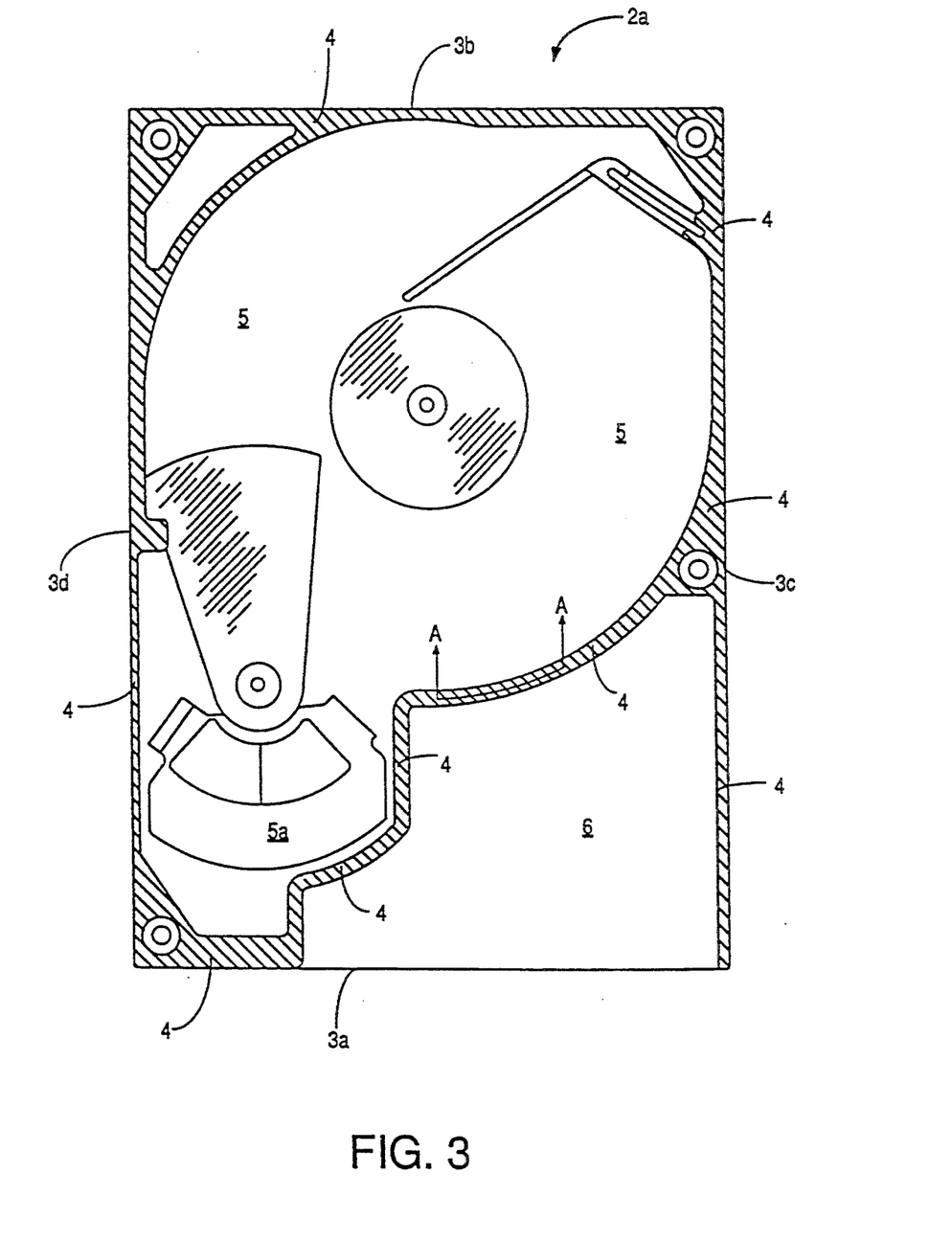
FIG. 3 is a bottom plan view of the cover member of the disk drive assembly of FIG. 1.

The lateral form factor area may be of any suitable shape and size. In some embodiments, the lateral form factor area is a substantially rectangular 4.00 inch by 5.75 inch shape. In other embodiments, the lateral form factor area is a substantially rectangular 2.75 inch by 4.00 inch shape. The enclosure comprises a first end 3a being an open end, a second end 3b, a first side 3c, a second side 3d, a top side 3e, and a bottom side 3f. A top surface of the top side and a bottom surface of the bottom side may be substantially planar and substantially parallel to each other. As seen in FIG. 3, cover member 2a comprises a wall portion 4 being a partition wall which is fashioned so that a sealed volume 5 and a circuit volume 6 are formed when a gasket 7 is sandwiched between the wall portion 4 of the cover member and the base member, the circuit volume 6 being substantially laterally displaced with respect to the sealed volume 5.

Figure 2:
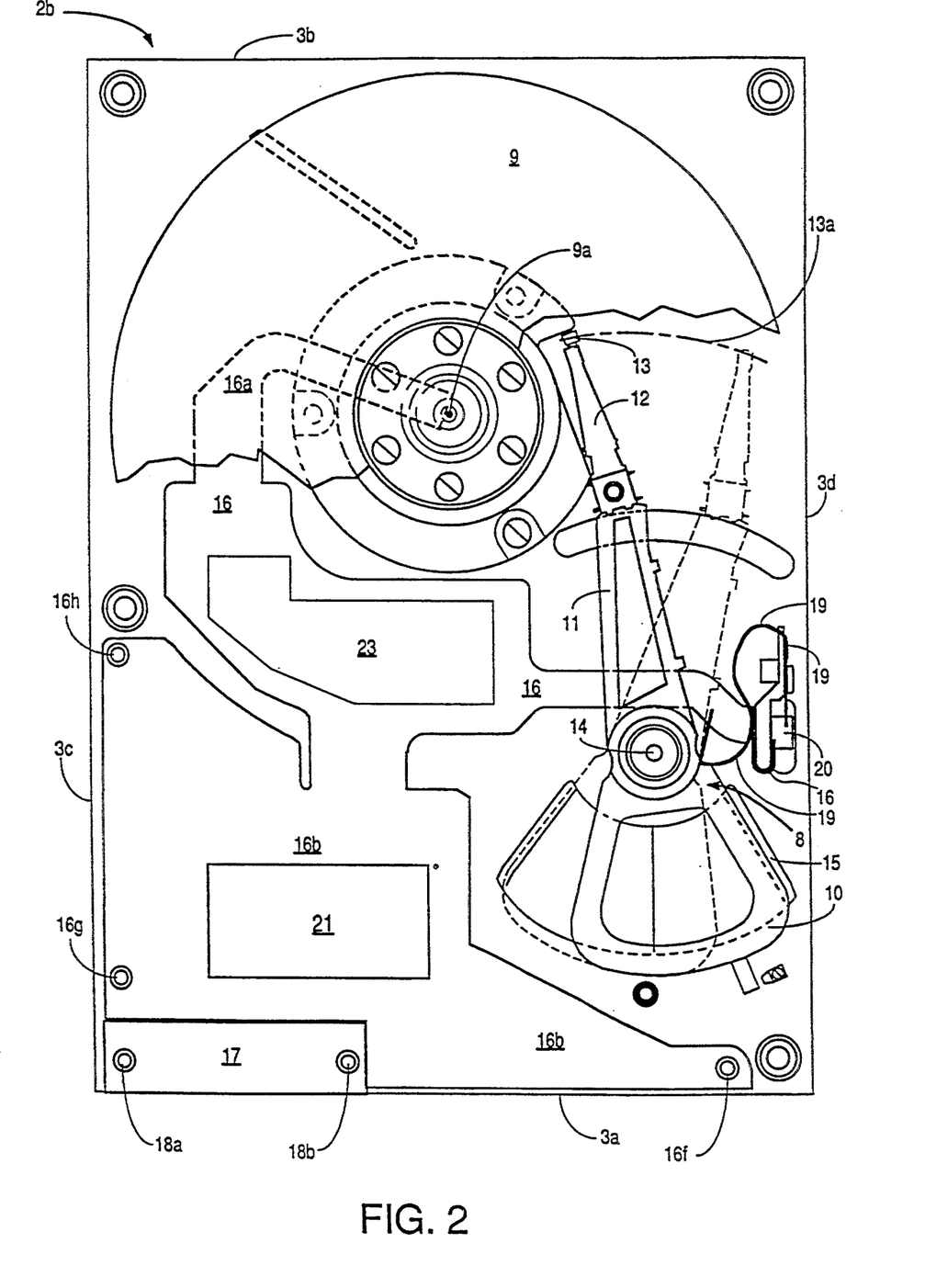
FIG. 2 is a top plan view, partially cut away, of the disk drive assembly of FIG. 1 with the cover member removed.

The sealed volume contains a read/write head actuator assembly 8 and one or more disks 9. In the embodiment shown in FIGS. 1–3, the read/write head actuator assembly comprises a coil 10, three actuator arms 11, four flexure members 12, and four read/write heads 13. This read/write head actuator assembly pivots on pivot journal 14 in response to electromagnetic interaction between coil 10 and permanent magnets 15. The read/write heads 13 are swept across the disk(s) in a path 13a between the spinning axis 9a of the disk(s) and the second side 3d of the enclosure. Accordingly, because the actuator arms 11 need not extend substantially diagonally across the enclosure, the circuit volume can have a larger lateral area. The permanent magnets are secured to the enclosure. In some embodiments, the permanent magnets are secured without screws but rather by a damping adhesive and the attractive force of pole pieces. In the embodiment shown in FIGS. 1–3, two disks are contained in the sealed volume.

In order to maximize the lateral area of the circuit volume 6 for placement of circuitry, the coil and permanent magnet portion of the read/write head actuator assembly is disposed in an extension portion 5a of the sealed volume 5. This extension portion 5a of the sealed volume 5 which extends laterally toward the corner of the enclosure formed by the first end 3a and the second side 3d of the enclosure. The circuit volume 6, on the other hand, is disposed in the enclosure so that the circuit volume substantially occupies a corner portion of the enclosure located between the first end 3a and the first side 3c of the enclosure. By locating both the extension portion 5a of the sealed volume and the circuit volume 6 in adjacent corners of the enclosure toward the first end 3a of the enclosure, the overall size of the form factor can be reduced while maintaining a large lateral area for the placement of circuitry within the circuit volume.

A first flexible circuit 16 extends substantially laterally from inside the sealed volume, through the portion of the enclosure separating the sealed volume 5 from the circuit volume 6, into the circuit volume 6, substantially laterally across the circuit volume 6, and to an interface connector 17 which faces out the first end 3a of the enclosure. The first flexible circuit 16 has an extension portion 16a which extends inside the sealed volume toward a spindle motor which drives the disk or disks 9. In the embodiment shown in FIGS. 1–3, the first flexible circuit 16 has a triangularly shaped portion 16b which substantially conforms to the lateral shape of the circuit volume 6; and the interface connector 17 is secured to the base member 2b via holes 18a and 18b in the interface connector and screws 18c and 18d; and the first flexible circuit is secured to base member 2b with screws 16c, 16d and 16e and holes 16f, 16g and 16h.

A second flexible circuit 19 is disposed within the sealed volume 5 to couple the read/write heads of the read/write head actuator assembly 8 to an actuator arm flexible circuit connector 20. The actuator arm flexible circuit connector 20 couples the second flexible circuit 19 to the first flexible circuit 16. The actuator arm flexible circuit connector 20 is provided in the sealed volume to allow the read/write head actuator assembly and the second flexible circuit to be removed from the first flexible circuit as a unit without disturbing the first flexible circuit. As can be seen from FIGS. 1 and 2, the second flexible circuit 19 has a first flexible loop with a first diameter and a second flexible loop with a second diameter. Although many different embodiments can be envisioned, in FIGS. 1 and 2, the first diameter and the second diameter area substantially equal creating an S-shaped second flexible circuit 19.

A multichip module 21 is disposed within the circuit volume 6 and is mounted on one surface of the first flexible circuit 16 so that the multichip module 21 is laterally spaced from the disk or disks 9 within the sealed volume. Placing the multichip module 21 in the circuit volume 6 prevents outgassing of the multichip module from contaminating the disk and read/write head assembly and thereby causing disk drive failures. Because the multichip module is mounted on the first flexible circuit and not on a printed circuit board, no flexible circuit to printed circuit board connector is required in the circuit volume. Accordingly, the lateral area that would otherwise be occupied by such a flexible circuit to printed circuit board connector is available for placement of circuitry. Moreover, eliminating the flexible circuit to printed circuit board connector eliminates the reliability problems associated with the connector and therefore results in improved disk drive assembly reliability. In some embodiments, the enclosure has a removable portion 22 which allows access to circuitry on the first flexible circuit within the circuit volume while maintaining the seal of the sealed volume. In the embodiment shown, removable portion 22 is secured to cover member 2a with screws 22d, 22e and 22f engaging holes 22a, 22b and 22c.

Preamplification circuitry 23 is disposed within the sealed volume and is also mounted on the first flexible circuit 16. The circuitry of the disk drive is separated in this way between the multichip module and the preamplification circuitry because it is desirable to place the preamplification circuitry close to the read/write heads and away from and shielded from the noisy digital circuitry. An assembly of the first flexible circuit 16, the multichip module 21, and the preamplification circuitry 23 may be preassembled and pretested as a unit before being assembled with the other parts of the disk drive assembly. In some embodiments, all electronic components such as the multichip module and the preamplification circuitry which are mounted to the first flexible circuit 16 are surface mount parts.

In some embodiments, the multiple integrated circuit chips comprising the circuitry of the multichip module 21 comprise nine integrated circuit chips. The first chip provides the functions of a sequencer/error correction code (ECC) element, servo timing buffer controller, and AT interface. The second chip provides random access memory which may be in the form of a static buffer RAM and may be of the type M51008VP manufactured by Mitsubishi. The third chip provides the read/write electronics control and may be a type Reach 1 manufactured by AT&T. The fourth chip is a synthesizer associated with the third chip and may be of the type SC84038 manufactured by Sierra Semiconductor. The fifth chip provides positioning signals to the actuator coil and may be of the type 8932 manufactured by Allegro Microsystems. The sixth chip provides the power to the drive spindle motor and may be of the type 8902 manufactured by Allegro Microsystems. The seventh chip is a microcontroller/servo processor and may be of the type Z86C94 manufactured by Zilog Inc. The eighth chip is a firmware ROM of 32K bytes and may be of any suitable type such as a 27C256 manufactured by Microchip. The ninth chip is a read/write filter and may be of the type 8011 from Silicon Systems, Inc. It is to be understood, however, that the above described circuitry is but one embodiment of the circuitry of the multichip module 21. Numerous other disk drive circuities are also advantageously realized in the disclosed multichip module on the first flexible circuit in the circuit volume in accordance with the present invention.

Figure 4:
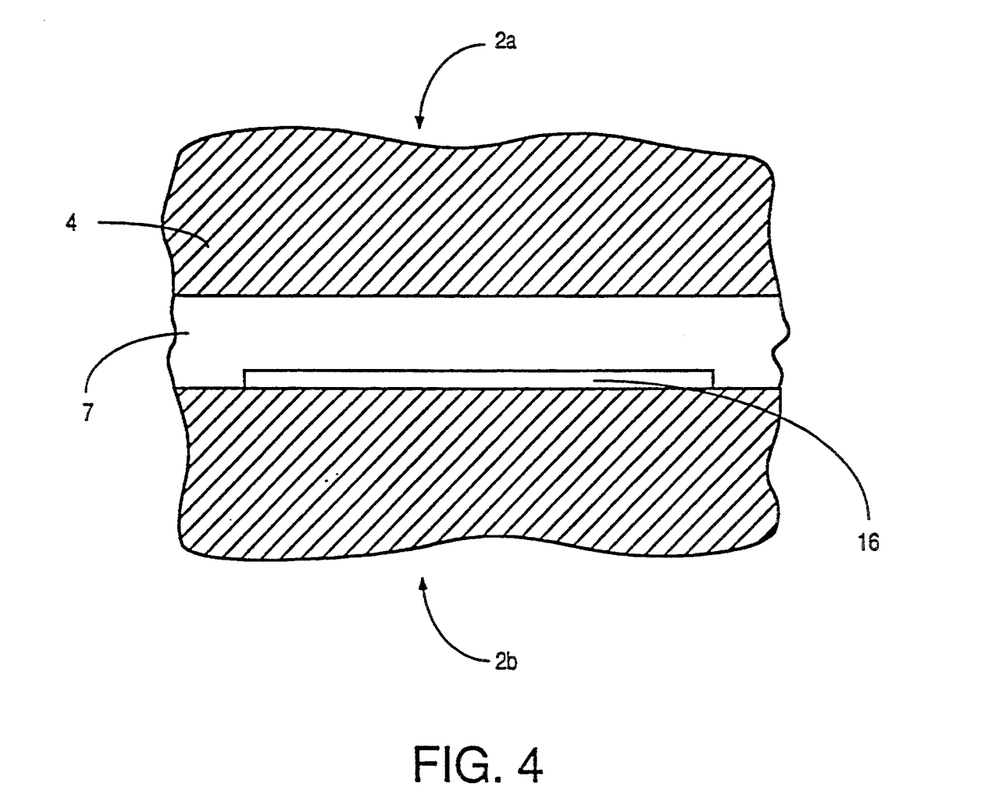
FIG. 4 is a cross-sectional view taken along line A—A of FIG. 3.

FIG. 4 is a cross sectional view of the flexible circuit 16 where it passes from inside the sealed volume 5, through the portion of the enclosure that separates the sealed volume 5 from the circuit volume 6, and into the circuit volume 6. In the embodiment shown in FIG. 4, the portion of the enclosure that separates the sealed volume from the circuit volume comprises wall 4 of the cover member 2a and gasket 7. The flexible circuit 16 is approximately 0.010 of an inch thick whereas the gasket 7 is approximately 0.050 of an inch thick. The gasket 7 conforms to the cross sectional form of the flexible circuit 16 when the gasket 7 is sandwiched with the flexible circuit 16 between the cover member 2a and the base member 2b. Because the sealed enclosure of the disk drive need not be totally hermetically sealed, some leakage between the sealed volume to the circuit volume around the flexible circuit is permissible. In some embodiments, the flexible circuit 16 may be recessed into the base member. In other embodiments, the flexible circuit may be disposed against the cover member rather than against the base member. In still other embodiments, the flexible member may be sandwiched between other parts of an enclosure assembly so long as the flexible circuit extends from inside the sealed volume, through a portion of the enclosure assembly separating the sealed volume from the circuit volume, and into the circuit volume. In yet other embodiments, the seal around the flexible circuit is established with a sealant such as an adhesive rather than by pressure alone.

Figure 5A:
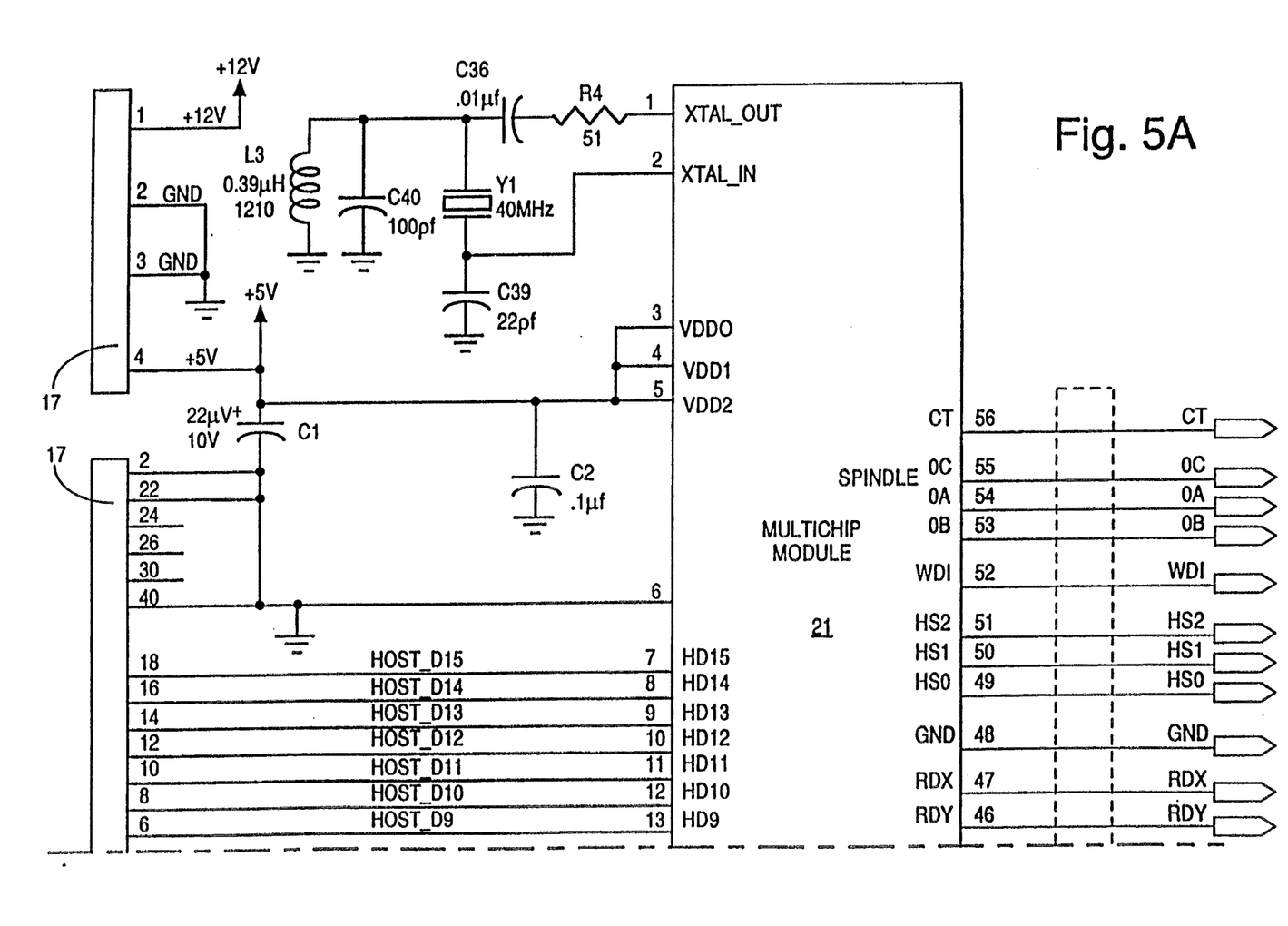
FIG. 5 is a diagram showing one possible pinout of a multichip module in accordance with the present invention.
Figures 5B, 5C:
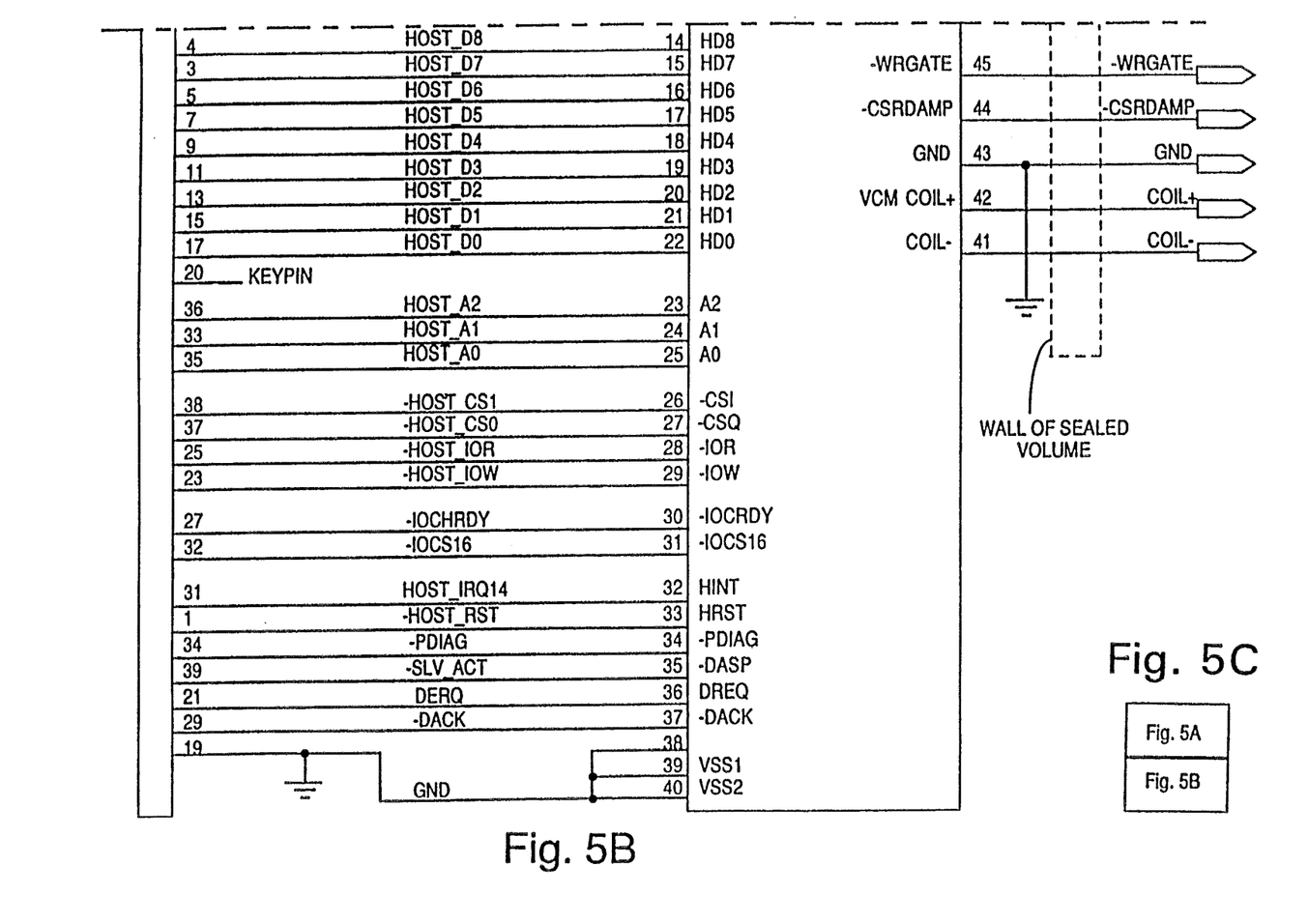

FIG. 5 shows one possible pinout of the multichip module and associated electronic components surface-mounted to the first flexible circuit in the circuit volume in accordance with one embodiment of the present invention. The dashed wall of the sealed volume indicates where the flexible circuit passes from the circuit volume and into the sealed volume. As shown in FIG. 5, interface connector 17 comprises more than one connector in some embodiments.

Although the invention has been described in connection with certain specific embodiments for illustrative purposes, the present invention is not limited thereto. The invention, for example, is applicable to any size of form factor including form factors smaller the 2.5 inches by 4.00. Either a single disk or any number of additional disks may be disposed within the sealed volume. Multiple types of read/write head actuator assemblies may be employed. The disk drive assembly may be made to have an interface other than an AT interface. It is to be understood, therefore, that various changes, modifications, and adaptations of the above described embodiments may be practiced without departing from the spirit and scope of the invention as set forth in the appended claims.

We claim:

1. A disk drive assembly comprising:
   a three dimensional enclosure housing having a lateral form factor area and a vertical thickness, the enclosure housing defined by a substantially planar enclosure base, a substantially planar enclosure cover, first and second side walls, an end wall, and an open end, the first and second side walls and end wall coupled between the enclosure base and the enclosure cover;
   a partition wall extending across the enclosure base opposite the open end and between two of said walls, the partition wall dividing the enclosure housing into an enclosed sealed volume and a substantially enclosed circuit volume adjacent the open end;
   at least one disk disposed within the sealed volume;
   at least one electronic circuit surface disposed within the circuit volume; and
   means extending across the partition wall for transmitting electrical signals between the sealed volume and the circuit volume.

2. The disk drive assembly defined in claim 1, wherein the means for transmitting electrical signals comprises a flexible circuit.

3. The disk drive assembly defined in claim 1, further comprising a head actuator assembly disposed within the sealed volume.

4. The disk drive assembly defined in claim 3, further comprising a second flexible circuit, the second flexible circuit coupled between the head actuator assembly and the means for transmitting electrical signals.

5. The disk drive assembly defined in claim 1, wherein the at least one electronic circuit surface comprises a multichip module.

6. The disk drive assembly defined in claim 1, wherein the at least one electronic circuit surface is coupled to the means for transmitting electrical signals.

7. The disk drive assembly defined in claim 1, wherein the means for transmitting electrical signals is coupled between the at least one disk and the at least one electronic circuit surface.

8. The disk drive assembly defined in claim 1, wherein the enclosure housing further comprises a removable portion disposed adjacent the circuit volume and away from the sealed volume.

9. The disk drive assembly defined in claim 1, further comprising preamplification circuitry disposed within the sealed volume.

10. The disk drive assembly defined in claim 1, further comprising an interface connector disposed in the circuit volume and coupled to the means for transmitting electrical signals.

11. The disk drive assembly defined in claim 1, wherein the circuit volume comprises a corner portion of the enclosure housing.

12. The disk drive assembly defined in claim 1, wherein the lateral form factor area is capable of receiving a 3.5 inch diameter disk.

13. The disk drive assembly defined in claim 1; wherein the lateral form factor area is capable of receiving a 2.5 inch diameter disk.

14. The disk drive assembly defined in claim 1; further comprising a seal disposed between the enclosure base and the enclosure cover.

15. The disk drive assembly defined in claim 14, wherein the seal comprises a gasket.

16. A disk drive assembly comprising:
   a three dimensional enclosure housing having a lateral form factor area and a vertical thickness, the enclosure housing defined by a substantially planar enclosure base, first and second side walls, an end wall, and an open end, the first and second side walls and end wall depending from the periphery of the enclosure base to a height of substantially the vertical thickness;
   a partition wall extending across the enclosure base opposite the open end and between two of said walls to a height of substantially the vertical thickness, the partition wall dividing the enclosure base to form an enclosure cavity;
   a substantially planar enclosure cover, the enclosure cover having substantially the same lateral form factor area as the enclosure housing and abutted to the enclosure housing to form an enclosed sealed volume over the enclosure cavity and a substantially enclosed circuit volume adjacent the open end within the enclosure housing;
   at least one disk disposed within the sealed volume;
   at least one electronic circuit surface disposed within the circuit volume; and
   means extending across the partition wall for transmitting electrical signals between the sealed volume and the circuit volume.

17. The disk drive assembly defined in claim 16, wherein the means for transmitting electrical signals comprises a flexible circuit.

18. The disk drive assembly defined in claim 16, further comprising a head actuator assembly disposed within the sealed volume.

19. The disk drive assembly defined in claim 18, further comprising a second flexible circuit, the second flexible circuit coupled between the head actuator assembly and the means for transmitting electrical signals.

20. The disk drive assembly defined in claim 16, wherein the at least one electronic circuit surface comprises a multichip module.

21. The disk drive assembly defined in claim 16, wherein the at least one electronic circuit surface is coupled to the means for transmitting electrical signals.

22. The disk drive assembly defined in claim 16, wherein the means for transmitting electrical signals is coupled between the at least one disk and the at least one electronic circuit surface.

23. The disk drive assembly defined in claim 16, wherein the enclosure housing further comprises a removable portion disposed adjacent the circuit volume and away from the sealed volume.

24. The disk drive assembly defined in claim 16, further comprising preamplification circuitry disposed within the sealed volume.

25. The disk drive assembly defined in claim 16, further comprising an interface connector disposed in the circuit volume and coupled to the means for transmitting electrical signals.

26. The disk drive assembly defined in claim 16, wherein the circuit volume comprises a comer portion of the enclosure housing.

27. The disk drive assembly defined in claim 16, wherein the lateral form factor area is capable of receiving a 3.5 inch diameter disk.

28. The disk drive assembly defined in claim 16, wherein the lateral form factor area is capable of receiving a 2.5 inch diameter disk.

29. The disk drive assembly defined in claim 16, further comprising a seal disposed between the enclosure housing and the enclosure cover.

30. The disk drive assembly defined in claim 29; wherein the seal comprises a gasket.

31. A disk drive assembly comprising:
a substantially planar enclosure base having a lateral form factor area;
a substantially planar enclosure cover having substantially the same lateral form factor area as the enclosure base;
first and second side walls, the first and second side walls coupled between the enclosure base and the enclosure cover;
an end wall coupled between the enclosure base and the enclosure cover to form a three dimensional enclosure housing having a vertical thickness and an open end;
a partition wall extending between the enclosure base and enclosure cover opposite the end wall, the partition wall dividing the enclosure base to form an en closure cavity;
a gasket disposed between the enclosure base and the enclosure cover to create a seal when the enclosure base and the enclosure cover are compressed into abutting relation and forming an enclosed sealed volume with the enclosure cavity, and a substantially enclosed circuit volume adjacent the open end within the lateral form factor area of the enclosure housing;
at least one disk disposed with in the sealed volume;
a head actuator assembly couple J to the at least one disk, the head actuator assembly disposed within the sealed volume;
electronics for controlling the head actuator, the electronics disposed within the circuit volume; and
a flexible circuit extending across the partition wall for transmitting electrical signals between the head actuator and the electronics.

32. The disk drive assembly defined in claim 31, wherein the first and second side walls and the end wall extend around the periphery of the enclosure base.-662

33. A method of providing electronics inside an enclosure housing of a disk drive assembly, comprising the steps of:
providing a three dimensional enclosure housing having a lateral form factor area and a vertical thickness, the enclosure housing defined by a substantially planar enclosure base, a substantially planar enclosure cover, first and second side walls, an end wall, and an open end, the first and second side walls and end wall coupled between the enclosure base and the enclosure cover;
dividing the enclosure housing into an enclosed sealed volume and a substantially enclosed circuit volume adjacent the open end by extending a partition wall across the enclosure base opposite the open end and between two of said walls;
inserting at least one disk within the sealed volume;
disposing at least one electronic circuit surface within the circuit volume; and
extending a connection across the partition wall for transmitting electrical signals between the sealed volume and the circuit volume.

* * * * *

UNITED STATES PATENT AND TRADEMARK OFFICE
CERTIFICATE OF CORRECTION

PATENT NO. : 5,446,609
DATED : August 29, 1995
INVENTOR(S) : William N. Thanos et al.   Page 1 of 2

It is certified that error appears in the above-indentified patent and that said Letters Patent is hereby corrected as shown below:

On the Title Page

In column 2, line 11, insert the following:

--*Attorney, Agent, or Firm*—Willian Brinks Hofer Gilson & Lione--.

In column 1, before "OTHER PUBLICATIONS", insert the following:

--FOREIGN PATENT DOCUMENTS

| | | |
|---|---|---|
| GB-A-2 051 458 | 05/1980 | England |
| EP-A-0 161 720 | 09/1982 | European Pat. Off. |
| JP-A-03 150 778 | 08/1989 | Japan--. |

In column 1, under "OTHER PUBLICATIONS", insert the following:

-- IEEE Transactions on Components, Hybrids, and Manufacturing Technology, vol. 11, no. 4, December 1988, New York, pages 576-584, XP105724, *Flow Visualization and Spectral Measurements in a Simulated Rigid Disk Drive*, ABRAHAMSON, KOGA & EATON.

I-Therm 88 (Intersociety Conference on Thermal Phenomena in the Fabrication and Operation of Electronic Components), 11 May 1988, Los Angeles, CA, pages 162-170, XP11602, *Flow and Thermal Fields in Channels Between Corotating Disks*, TOROK & GRONSETH.--

UNITED STATES PATENT AND TRADEMARK OFFICE
CERTIFICATE OF CORRECTION

PATENT NO. : 5,446,609
DATED : August 29, 1995
INVENTOR(S) : William N. Thanos et al.

It is certified that error appears in the above-indentified patent and that said Letters Patent is hereby corrected as shown below:

In the Claims

Col. 7, In claim 11, line 2, delete "comer" and substitute --corner--.

Col. 8, In claim 13, line 1, delete ";" and substitute --,--.

In claim 14, line 1, delete ";" and substitute --,--.

Col. 9, In claim 31, line 17, delete "en closure" and substitute --enclosure--.

Col. 10, In claim 31, line 26, delete "with in" and substitute --within--.

In claim 31, line 27, delete "couple J" and substitute --coupled--.

In claim 32, line 3, delete "-662".

Signed and Sealed this

Third Day of December, 1996

Attest:

BRUCE LEHMAN

*Attesting Officer*      *Commissioner of Patents and Trademarks*